United States Patent
Haraguchi

[11] Patent Number: 6,097,900
[45] Date of Patent: *Aug. 1, 2000

[54] APPARATUS FOR SWITCHING AN ASPECT RATIO OF AN IMAGING FIELD FRAME

[75] Inventor: Shosuke Haraguchi, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/941,563

[22] Filed: Sep. 30, 1997

Related U.S. Application Data

[63] Continuation of application No. 08/354,071, Dec. 6, 1994, abandoned.

[30] Foreign Application Priority Data

Dec. 7, 1993 [JP] Japan ................................. 5-306747
Dec. 7, 1993 [JP] Japan ................................. 5-306748

[51] Int. Cl.[7] .................................................. G03B 17/00
[52] U.S. Cl. ........................... 396/287; 396/296; 396/435
[58] Field of Search ..................... 396/281, 287, 396/290, 291, 292, 295, 296, 373, 374, 378, 380, 435, 436; 345/55, 87; 368/223, 242

[56] References Cited

U.S. PATENT DOCUMENTS

| | | | |
|---|---|---|---|
| 4,688,898 | 8/1987 | Oldendorf et al. | 345/34 |
| 5,258,790 | 11/1993 | Tanaka | 354/94 |
| 5,323,196 | 6/1994 | Labaziewicz | 354/159 |
| 5,410,381 | 4/1995 | Kameyama et al. | 396/378 |

FOREIGN PATENT DOCUMENTS

| | | |
|---|---|---|
| 2-34670 | 9/1990 | Japan . |
| 6-18979 | 1/1994 | Japan . |

*Primary Examiner*—David M. Gray
*Attorney, Agent, or Firm*—Fitzpatrick, Cella, Harper & Scinto

[57] ABSTRACT

An imaging field region display apparatus for switching an aspect ratio of the imaging field includes a first display device that displays a first imaging field region in which an imaging field display state changes in the first imaging field region and a second display device that displays a second imaging field region in which an imaging field display state changes in the second imaging field region, which differs from the first imaging field region, and displays a third imaging field region, which is at least one part of the first imaging field region. The second display device also causes a boundary between the second and the third imaging field regions to appear to be continuous.

25 Claims, 16 Drawing Sheets

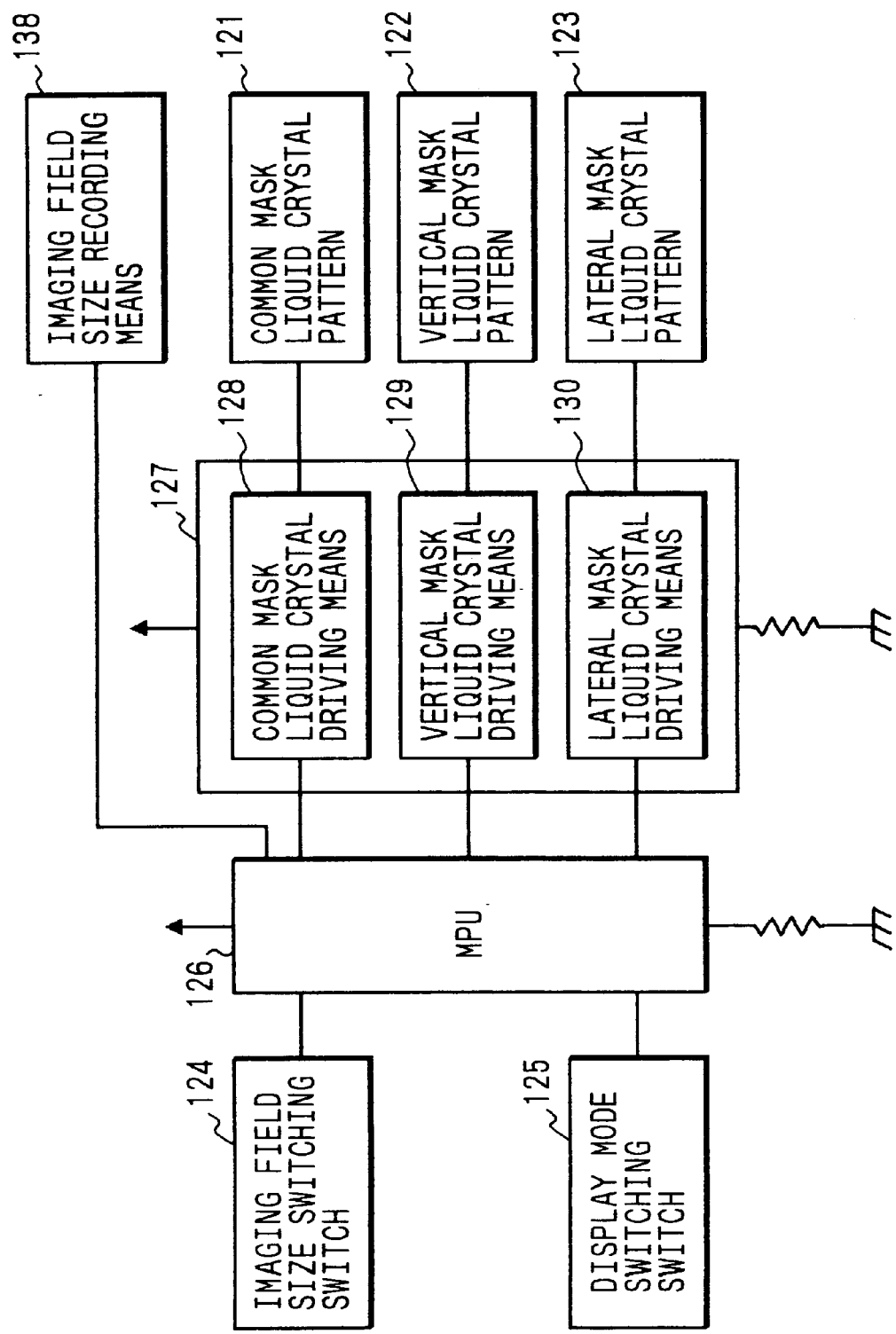

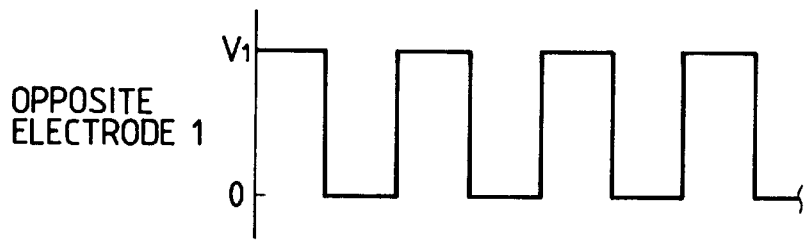
FIG. 22A OPPOSITE ELECTRODE 1
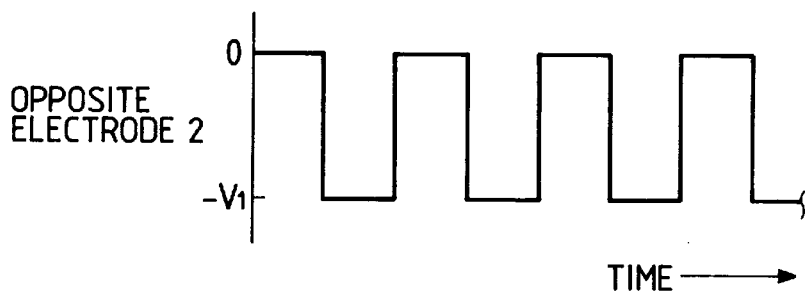
FIG. 22B OPPOSITE ELECTRODE 2
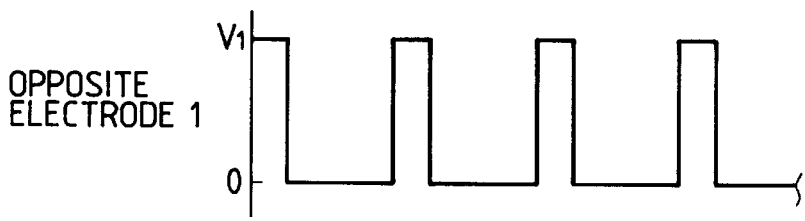
FIG. 23A OPPOSITE ELECTRODE 1
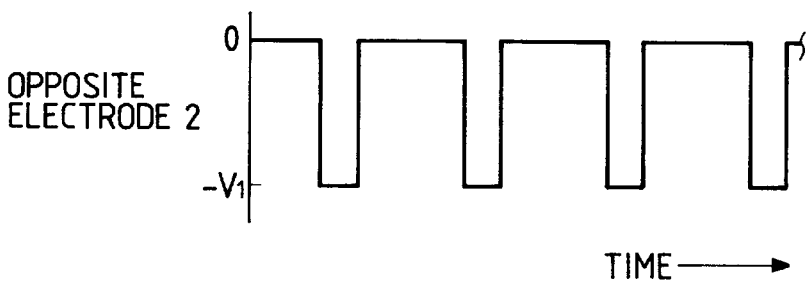
FIG. 23B OPPOSITE ELECTRODE 2

APPARATUS FOR SWITCHING AN ASPECT RATIO OF AN IMAGING FIELD FRAME

This application is a continuation of application Ser. No. 08/354,071 filed Dec. 6, 1994, now abandoned.

BACKGROUND OF THE INVENTION

1. Field of the Invention

The present invention relates to an imaging field frame switching apparatus that switches imaging fields such as those for the viewfinders of cameras.

2. Related Background Art

In a previously submitted Japanese Patent Application Laid-Open No. 6-18979, the present applicant made a proposal concerning a camera that can switch photo-taking aspect ratios. The aspect ratio for a full size imaging field (the vertical and the lateral ratio of an imaging field) is 1:1.8 and is represented by "H", the aspect ratio for a vertical trimming imaging field is about 1:1.5 and is represented by "L", and the aspect ratio for a lateral trimming imaging field is about 1:2.8 and is represented by "P".

FIGS. 27 through 29 are diagrams for an example where two different light interception states for an imaging field are selected by using a photoelectric device, such as a liquid crystal device, and an imaging field size display, which is disclosed in Japanese Patent Application Laid-Open No. 6-18979, is provided for a viewfinder.

FIG. 27 is a diagram showing all the masking patterns that are employed for a liquid crystal device. Reference number 201 denotes a view frame of a full size imaging field "H"; 202a, 202b, 202c, and 202d, common liquid crystal mask patterns; 203a and 203b, vertical liquid crystal mask patterns; 204a and 204b, lateral liquid crystal mask patterns. Discontinuous regions are present between the patterns at their divisions, as is shown in FIG. 27.

FIG. 28 shows the display state of a vertically elongated imaging field "L", with the common liquid crystal mask patterns 202a, 202b, 202c, and 202d and the vertical liquid crystal mask patterns 203a and 203b in the light intercepted state. FIG. 29 shows the display state of the laterally elongated imaging field "P", with the common liquid crystal mask patterns 202a, 202b, 202c, and 202d and the lateral liquid crystal mask patterns 204a and 204b in the light intercepted state. The full size imaging field "H" is displayed by setting all the liquid crystal mask patterns to a transparent state.

In the above described conventional example, however, since there are gaps between the common liquid crystal mask patterns 202 and the vertical liquid crystal mask patterns 203, and between the common liquid crystal mask patterns 202 and the lateral liquid crystal mask patterns 204, discontinuous portions appear when the imaging fields "L" and "P" are displayed, and unwanted light transparent portions exist, causing an imaging field to have a strange and unnatural appearance.

In Japanese Utility Model Publication No. 2-34670 has been proposed a technique which is performed within a viewfinder by employing a photoelectric device, such as a liquid crystal device. FIGS. 30A though 30D show the switching of imaging field sizes and the display of a selected imaging field, which is disclosed in the above Utility Model Publication. There are first display patterns ($A_1$ and $A_2$), where an imaging field size is represented by linear patterns, and second display patterns ($B_1$ and $B_2$), which are employed to intercept light that is outside the first display patterns. An imaging field size can be changed by a first mode (in FIGS. 30B and 30D), where the first and second display patterns are employed to set the external region along the imaging field to an almost complete light intercepted state, and by a second mode (in FIGS. 30A and 30C), where only the first display pattern is employed to represent only the frame of the imaging field by linear patterns and to set the external, full size imaging field region to its fully transparent state.

In the above described conventional case, however, when the second mode is selected to enable the viewing of an image in the external region of the first display pattern, an image that is in an external region of a predetermined imaging field presents as good a target as an image that is in the predetermined imaging field, and a photographer might take a picture while erroneously considering the entire visible field to be a photographic image field, regardless of the presence of an imaging field frame. In addition, as there are many pattern separation lines, the discontinuous portions due to the pattern divisions are noticeable and disconcerting when the first mode is displayed. This is not desirable and makes a photographer feel insecure.

SUMMARY OF THE INVENTION

It is an object of the present invention to provide an imaging field frame switching apparatus that switches imaging fields such as those for the viewfinders of cameras.

According to one aspect of the present invention, an imaging field region display apparatus comprises: a first means, for displaying an imaging field region and for changing an imaging field display state in a first imaging field region; and a second means, for displaying an imaging field region, that includes a means for changing an imaging field display state in a second imaging field region, which differs from the first imaging field region, and a third imaging field region, which constitutes at least one part of the first imaging field region, and for permitting a boundary between the second and the third imaging field regions to appear to be contiguous.

In the above arranged display apparatus that can switch a plurality of imaging field display states, unnatural boundaries can be eliminated.

According to another aspect of the present invention, an imaging field region display apparatus comprises: a first means for displaying an imaging field region and for changing an imaging field display state in a first imaging field region; a second means, for displaying an imaging field region, that includes a means, for changing an imaging field display state in a second imaging field region, for enabling the display of the imaging field region, by working both with and without the first means, and for permitting a boundary between the first imaging field region and the second imaging field region to appear to be contiguous when an imaging field region is displayed in coordination with the first means.

In the above arranged display apparatus that can switch a plurality of imaging field display states, unnatural boundaries can be eliminated.

According to a further aspect of the present invention, an imaging field region display apparatus comprises a display portion, which is employed for displaying an imaging field region, for altering an imaging field display, by changing a state wherein light to an imaging field is intercepted, and for intercepting light so as to enable visual recognition of a light intercepted portion in the imaging field when light to at least one part of the imaging field is intercepted.

With this arrangement, erroneous identification of an imaging field can be prevented, and at the same time an image that extends beyond the limits of a selected imaging field can be identified.

BRIEF DESCRIPTION OF THE DRAWINGS

FIG. 21 is a block diagram showing a driving means of the fifth embodiment;

FIGS. 22A and 22B are timing charts for a method of driving the first display mode of the fifth embodiment;

FIGS. 23A and 23B are timing charts for a method of driving the second display mode of the fifth embodiment;

DETAILED DESCRIPTION OF THE PREFERRED EMBODIMENTS

FIGS. 1 through 6 illustrate a first embodiment of the present invention.

Figure 1:
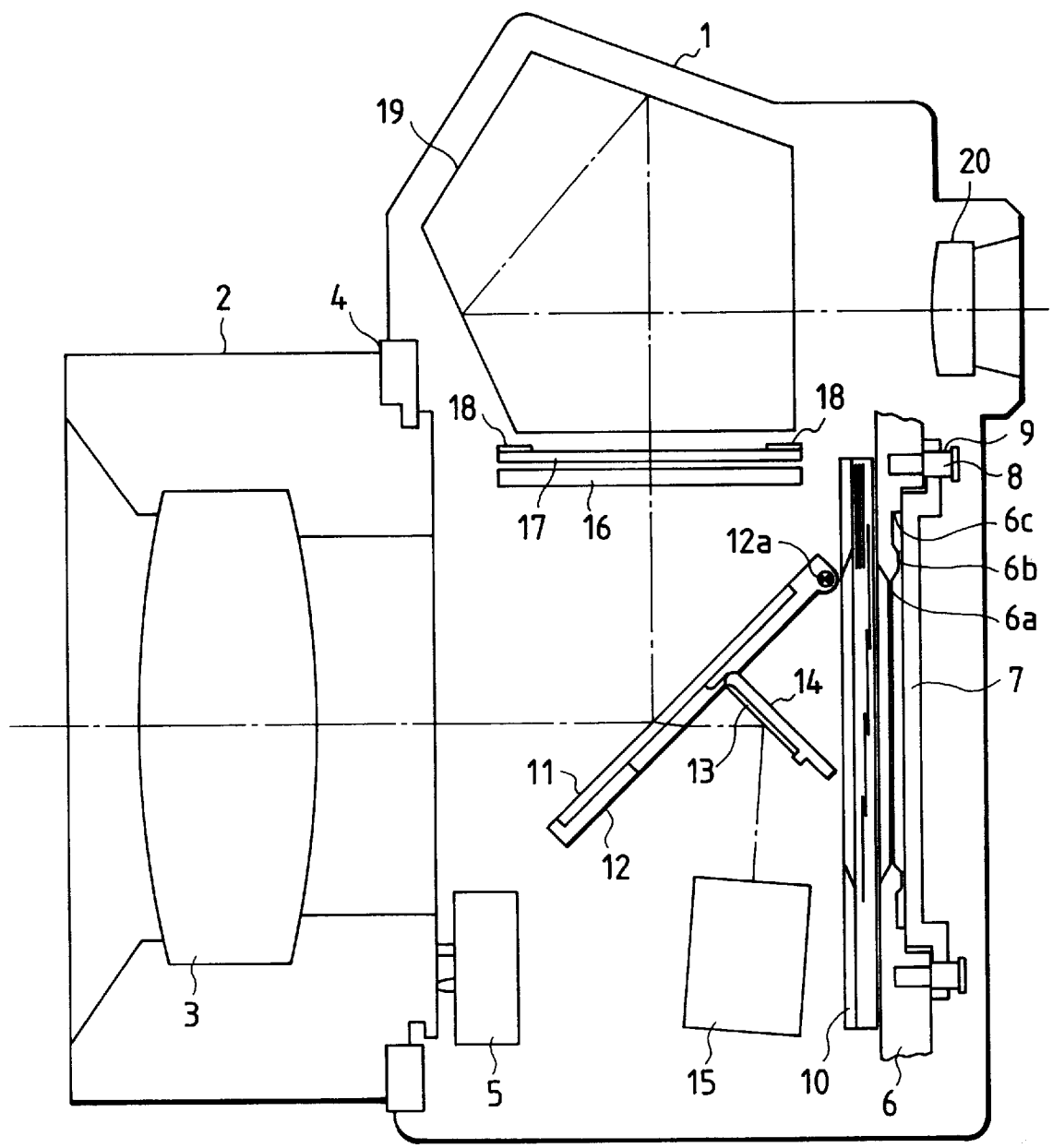
FIG. 1 is a schematic diagram illustrating a camera according to a first embodiment of the present invention.

FIG. 1 is a diagram showing the general layout of a camera in the first embodiment. A single-lens reflex camera that has a replaceable lens is employed in this embodiment. A lens 3, an aperture, and a focusing mechanism are provided in a lens barrel 2 that is attached by a camera mount 4 to a camera body 1. A communication unit 5 provides electric data communication with the lens barrel 2. A member 6 that forms the basic structure of the camera body 1 has an imaging field frame 6a, an internal rail 6b, and an external rail 6c. A film pressure plate 7 is attached to the member 6 through a spring 9 by a machine screw 8. The top and bottom of a film (not shown) are positioned along the external rail 6c and held in position at an image exposure location by the internal rail 6b and the film pressure plate 7. Reference number 10 denotes a focal plain shutter unit. A main mirror 11, held by a holding frame 12, can pivot on a shaft 12a. A submirror 13, held by a holding frame 14, can swing with respect to the holding frame 12.

During observation through the viewfinder in FIG. 1, the main mirror 11 is employed as a semi-transparent mirror, so that a light that passes through the lens 3 is separated into light that is reflected by the main mirror 11 and directed to the viewfinder, and light that passes through the main mirror 11 and is led to the submirror 13. The submirror 13 is a full reflecting mirror, and all the light directed to the submirror 13 is reflected and aimed at an AF unit 15, which detects a focus.

The viewfinder will now be explained. A focusing screen 16 is located at a position that is equivalent to that of the film surface for the visual recognition of the focused state of a target image. Reference number 17 denotes an imaging field size liquid crystal display unit; 18, a field frame; 19, a pentaprism; and 20, an eyepiece. With this arrangement, a photographer can determine via the eyepiece 20 the focused state of a target image on the focusing screen 16 and an imaging field size that is formed by the field frame 18 and the imaging field size liquid crystal display unit 17. The imaging field size liquid crystal display unit 17 and the field frame 18 approach the focusing screen 16 as nearly as possible to match the diopter scales of the target image and the imaging field size, and forms a viewfinder that is easy to see through. An explanation of the method employed to hold the focusing screen 16, the imaging field size liquid crystal display unit 17, the field frame 18, and the pentaprism 19 will not be given here.

The imaging field size liquid crystal display unit 17 will now be described. A preferable liquid crystal unit in this embodiment must have a high light transmittance in the light transmission state in order to provide a bright viewfinder image. Thus, a liquid crystal device that does not require a polarizing plate is desirable. More specifically, a guest-host liquid crystal, or a liquid crystal (PDLC), that utilizes the birefringence of a liquid crystal to control light dispersion and light transmission, may be employed. With such a liquid crystal device, the transmittance of light in a non-light intercepting portion can be increased to 70 to 80%. The liquid crystal device consists of liquid crystal sandwiched between two glass plates. Transparent electrodes that control the light transmission and no light transmission states are provided on one of the glass surfaces that contact the liquid crystal. For electric mounting in a camera, it is necessary for the above transparent electrode to be connected to a camera controller. Since this is well known in the prior art, a detailed explanation will not given.

Figure 2:
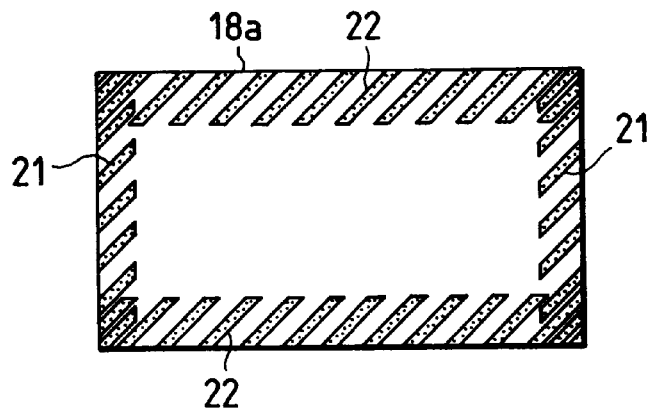
FIG. 2 is a diagram showing all the display patterns of imaging field regions in a liquid crystal display unit in FIG. 1.
Figure 3:
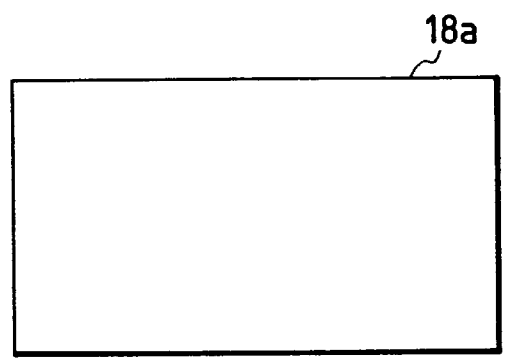
FIG. 3 is a diagram showing a full size imaging field displayed in the imaging field region liquid crystal display unit in FIG. 1.
Figure 4:
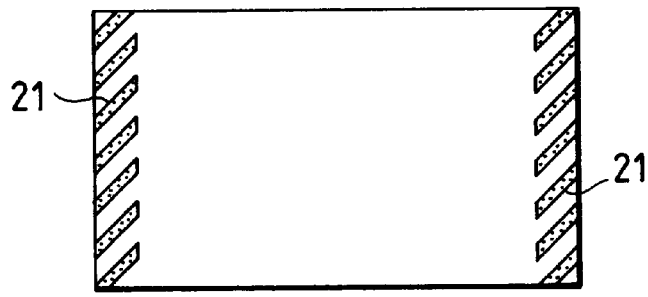
FIG. 4 is a diagram showing a vertically elongated imaging field displayed in the imaging field region liquid crystal display unit in FIG. 1.
Figure 5:
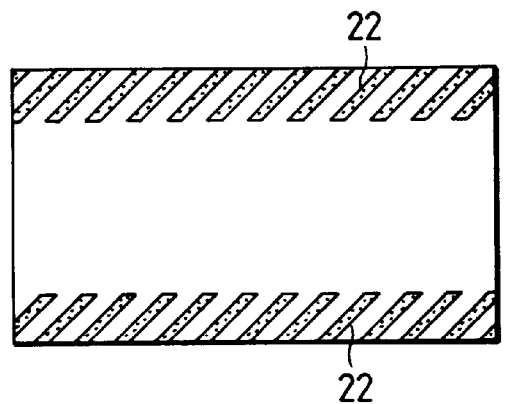
FIG. 5 is a diagram showing a laterally elongated imaging field displayed in the imaging field region liquid crystal display unit in FIG. 1.
Figure 6:
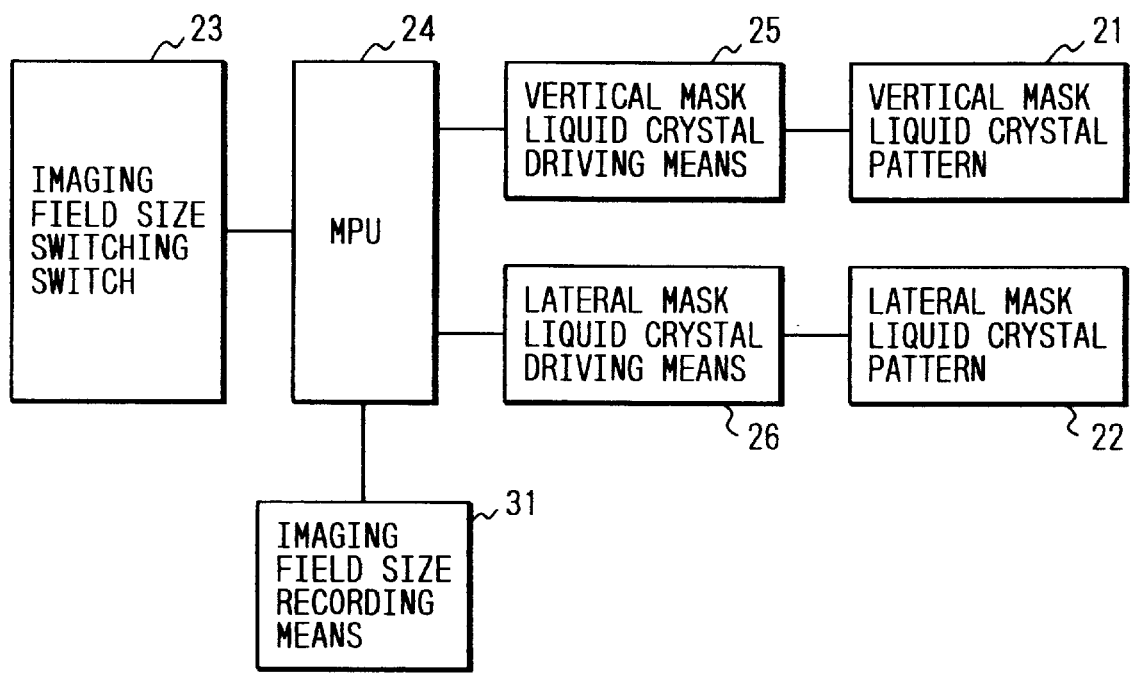
FIG. 6 is a block diagram illustrating a controller of the first embodiment.

FIGS. 2 through 6 show display embodiments of imaging field sizes. FIG. 2 is a diagram for all the liquid crystal patterns. FIG. 3 shows the display state of a full size imaging field "H" (an aspect ratio, a vertical-lateral ratio of an imaging field, of about 1:1.8); FIG. 4 shows the display state of a vertical trimming imaging field "L" (an aspect ratio of about 1:1.5), and FIG. 5 shows the display state of a lateral trimming imaging field "P" (an aspect ratio of about 1:2.8). FIG. 6 is a block diagram of a liquid crystal pattern controller. An explanation will now be given while referring to FIGS. 2 through 6. The full size imaging field "H" in FIG. 3 is masked by the field frame 18 and displayed as an internal face 18a. Although when viewed through the viewfinder the outside of the face 18a is blacked out, this is not shown in all the drawings. A vertical liquid crystal mask pattern 21 is employed to display the vertical trimming imaging field "L", as is shown in FIG. 4. A lateral liquid crystal mask pattern 22 is employed to display the lateral trimming imaging field "P", as is shown in FIG. 5. To switch the above display, one of the fields "H", "L", and "P" is selected by manipulating an imaging field size switching switch 23; a signal is sent to an MPU 24 to drive either the vertical liquid crystal mask pattern 21 or the lateral liquid crystal mask pattern 22, via a vertical liquid crystal mask driving means 25, or a lateral liquid crystal mask driving means 26. When no voltage has been applied, the vertically masked liquid crystal pattern 21 and the laterally masked liquid crystal pattern 22 are in the light transmission state, i.e., in the "H" display state shown in FIG. 3. When "L" is selected, the vertical liquid crystal mask driving means 25 is activated and applies a voltage to the vertical mask liquid crystal pattern 21 to set that pattern to the blacked out state, as is shown in FIG. 4. When "P" is selected, the lateral liquid crystal mask driving means 26 is activated and applies a voltage to the lateral liquid crystal mask pattern 22 to set that pattern to the blacked out state, as is shown in FIG. 5.

An imaging field size recording means 31 in FIG. 6 records on film an imaging field size that is selected by the imaging field size switching switch 23. The MPU 24 controls the recording so that the "H", "L", and "P" that are displayed by the imaging field size liquid crystal display unit 17 correspond to the "H", "L", and "P" that are recorded on the film by the imaging field size recording means 31. Although there are various methods of recording imaging field sizes, the following two methods are often employed. With one method, a system wherein dot patterns that represent "H", "L," and "P" are projected onto a film, on which a plurality of LEDs are located, while the movement of the film is stopped, a photo finisher is informed of the imaging field size data, so that an imaging field size that is displayed by the imaging field liquid crystal display unit 17 corresponds to the size of a print that is processed by the photo finisher. With the other method, a system that employs a film that is coated with a magnetic medium, while the film is moving forward in a camera within which a magnetic head is mounted, a signal that indicates "H", "L", or "P" is magnetically recorded on the film to inform a photo finisher of the imaging field data, so that an imaging field size that is displayed by the imaging field size liquid crystal display unit 17 corresponds to the size of a print that is processed by a photo finisher. Other methods may be employed as long as they can record data.

The imaging field frame 6a corresponds to the full size imaging field "H". An imaging field in a camera is thus "H" and during printing by a photo finisher a desired size, either "H", "L", or "P" is obtained.

Besides the system wherein the imaging field size displayed by a viewfinder corresponds to a print size, as described above, another method can also be considered. In the arrangement where a light intercepting member is located in the imaging field frame 6a and a light exposure imaging field switching mechanism is provided, the positioning of the light intercepting member is altered, by manipulation of the imaging field size switching switch 23, and the light intercepted condition of the imaging field is changed and the light exposure imaging field for a film is set to the "H", "L", or "P" size so that the size of the imaging field displayed by a viewfinder corresponds to the selected light exposure region. The light exposure region switching mechanism is proposed in U.S. Pat. No. 5,258,790 and U.S. Pat. No. 5,323,196 (both for normal and for panoramic imaging field size switching).

Figure 7:
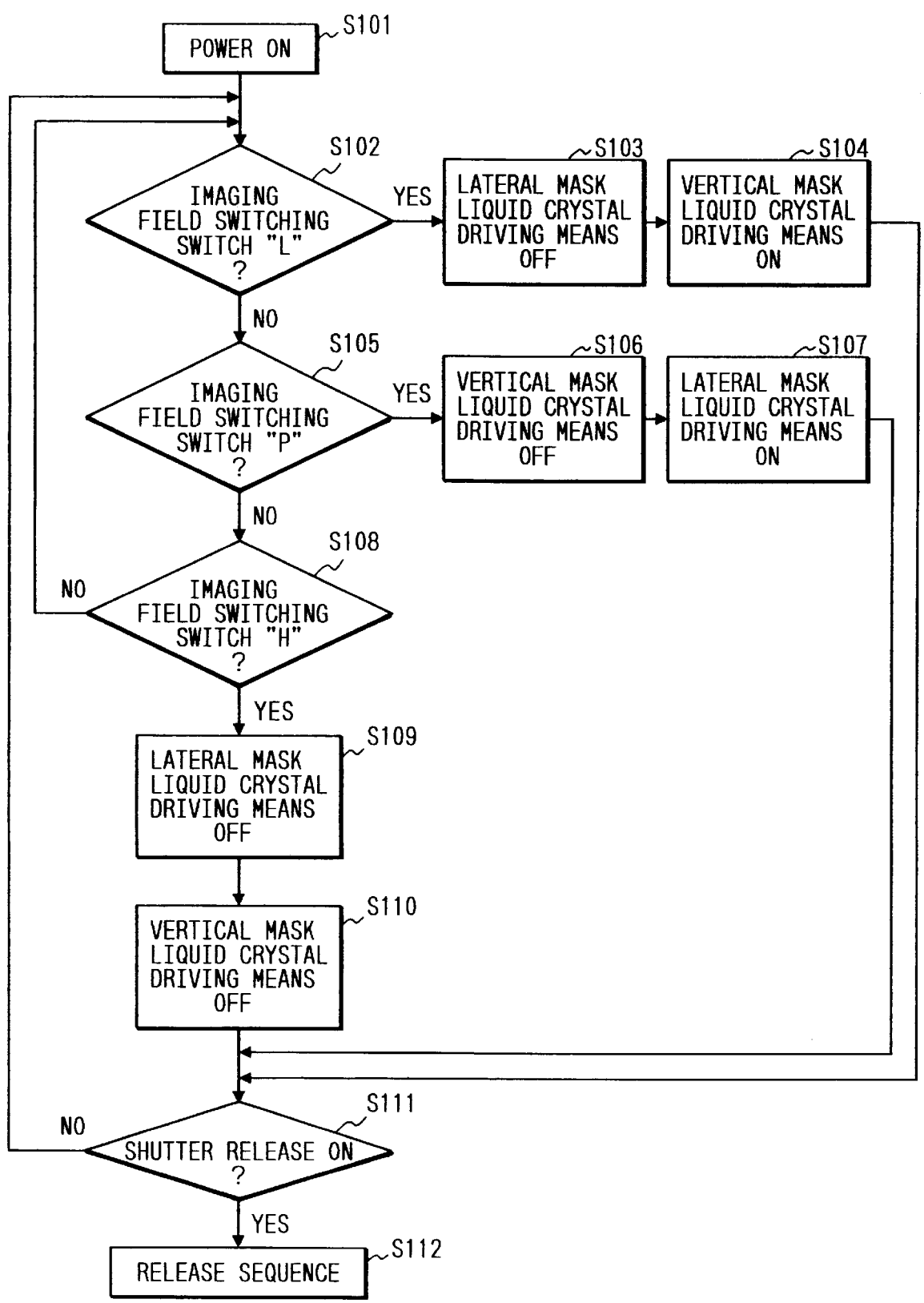
FIG. 7 is a flowchart showing the processing for the camera of the first embodiment.

FIG. 7 is a flowchart for the imaging field size switching process.

When power is turned on at S101, processing in consonance with the state of the imaging field switching switch 23 is performed. If, at S102, "L" has been selected, the lateral liquid crystal mask driving means 26 is turned off at S103, the vertical liquid crystal mask driving means 25 is turned on at S104 to display the vertical liquid crystal mask pattern 21, and program control advances to S111.

If, at S102, "L" is not selected, program control advances to S105. When "P" is selected at S105, the vertical liquid crystal mask driving means 25 is turned off at S106, the lateral liquid crystal mask driving means 26 is turned on at S107 to display the lateral liquid crystal mask pattern 22, and program control advances to S111.

When "P" is not selected at S105, program control moves to S108. If "H" is not selected at S108, program control returns to S102, while if "H" is selected, the lateral liquid crystal mask driving means 26 is turned off at S109, the vertical liquid crystal mask driving means 25 is turned off at S110 so that no liquid crystal patterns shown in FIG. 3 are displayed, and program control moves to S111. If, at S111, a shutter release switch is on, program control moves to S112 for a release sequence, where a film is exposed to light according to a predetermined sequence, and at the same time the above described imaging field size recording means is operated to record image data and image field size data on the film. If the shutter release switch is off at S111, program control returns to S102 and the preceding sequential processing is repeated.

Although in the above explanation the display is switched by manipulating the imaging field size switching switch 23, the MPU 24 may automatically define a scene and automatically change an imaging field size.

The characteristics of the vertical liquid crystal mask pattern 21 and the lateral liquid crystal mask pattern 22 will now be described. All the patterns are arranged in parallel, with an inclination of approximately 45°. The vertical liquid crystal mask pattern 21 and the lateral liquid crystal mask pattern 22 are assemblages of lines having a predetermined width that are provided at equal intervals. To prevent patterns from interfering with each other at the four corners, the vertical liquid crystal mask pattern 21 and the lateral liquid crystal mask pattern 22 are shifted by about ½ pitch in this embodiment. It is apparent from this arrangement that, when all the pattern widths are identical, a light transmitted pattern is broader than a light intercepted pattern by the gap that is required for pattern division, as is represented at the four corners in FIG. 2.

With the above arrangement, a natural mask having the same pitch can be displayed, and a target image in the full size imaging field, which corresponds to the "H" imaging field, can be schematically viewed at the time of exposure for an "L" or a "P" size image.

Figure 8:
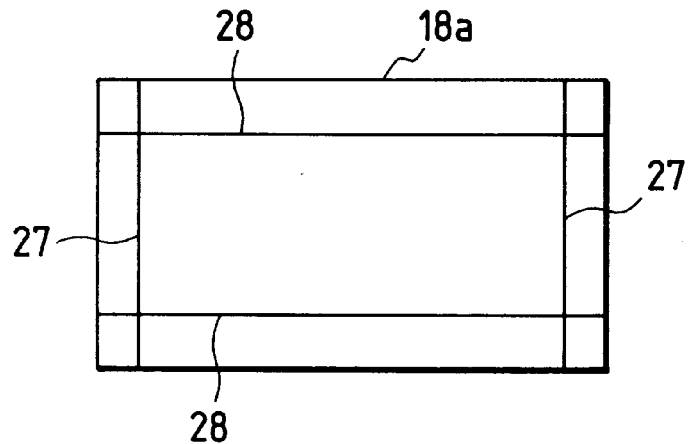
FIG. 8 is a diagram showing a full size imaging field in an imaging field region liquid crystal display unit according to a second embodiment of the present invention.
Figure 9:
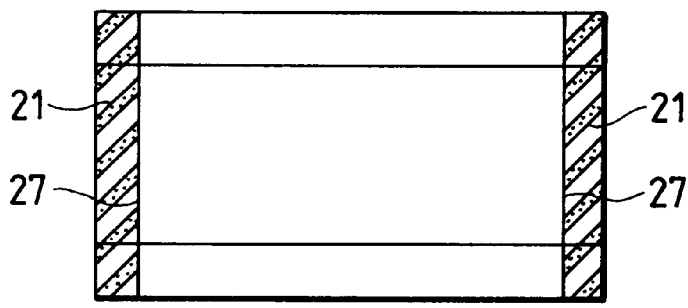
FIG. 9 is a diagram showing a vertically elongated imaging field in the imaging field region liquid crystal display unit of the second embodiment.
Figure 10:
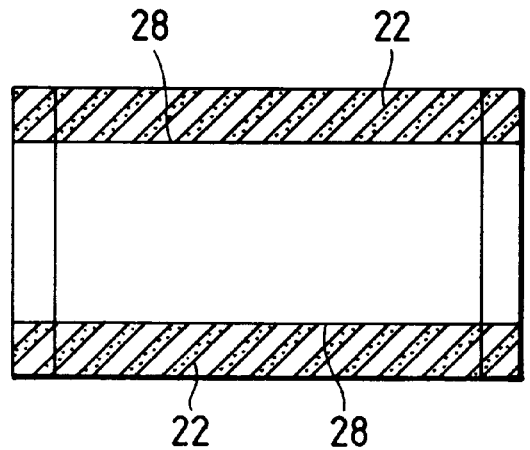
FIG. 10 is a diagram showing a laterally elongated imaging field displayed in the imaging field region liquid crystal display unit of the second embodiment.

FIGS. 8 through 10 show a second embodiment of the present invention. FIG. 8 shows the display for the "H" imaging field; FIG. 9, the display for the "L" imaging field; and FIG. 10, the display for the "P" imaging field. In this embodiment, an L size fixing display 27 and a P size fixing display 28 are added to those components of the first embodiment. The above described fixing displays may be represented as marking lines directly inscribed on the focusing screen 16, or may be inscribed on the glass surface of the imaging field size liquid crystal display unit 17. While in the first embodiment the edges of the imaging fields "L" and "P" are represented by discontinuous lines, in the second embodiment the edges are clearly defined by easily distinguished lines.

Figure 11:
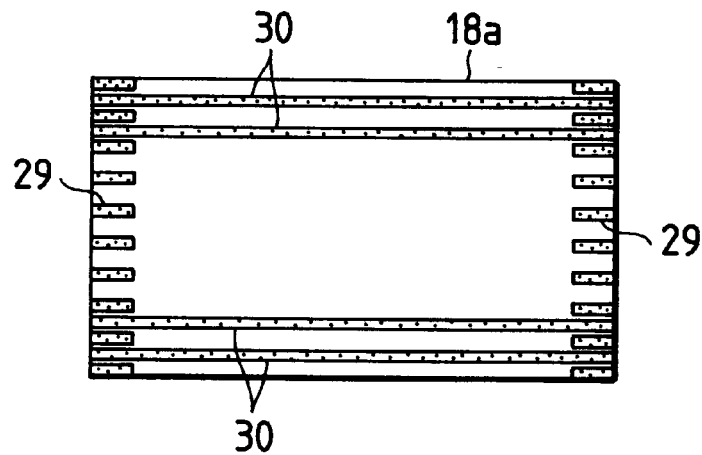
FIG. 11 is a diagram showing a full size imaging field in an imaging field region liquid crystal display unit according to a third embodiment of the present invention.
Figure 12:
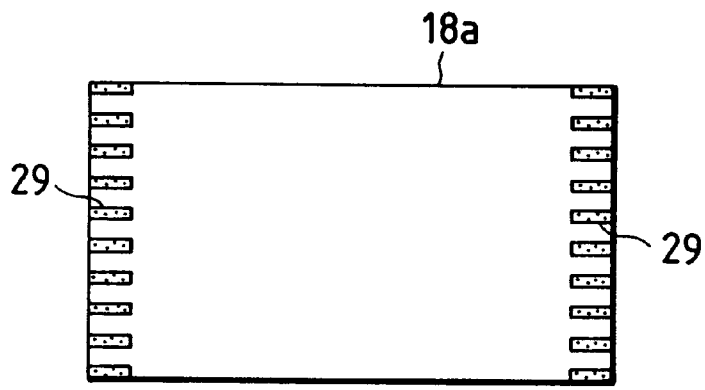
FIG. 12 is a diagram showing a vertically elongated imaging field in the imaging field region liquid crystal display unit of the third embodiment.
Figure 13:
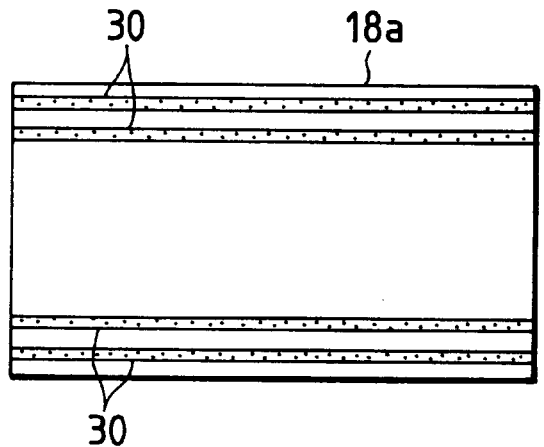
FIG. 13 is a diagram showing a laterally elongated imaging field displayed in the imaging field region liquid crystal display unit of the third embodiment.

FIGS. 11 through 13 show a third embodiment of the present invention.

FIG. 11 is a diagram for the locations of all patterns; FIG. 12, for the display of the "L" imaging field; and FIG. 13, for the display of the "P" imaging field. In this embodiment, the liquid crystal mask patterns of the first embodiment are changed. Reference number 29 denotes a vertical liquid crystal mask pattern, and 30 denotes a lateral liquid crystal mask pattern. All the patterns employed in this embodiment are formed horizontally, while the patterns in the first embodiment are inclined at about 45°. The basic ideas for the pattern arrangements are the same as those explained in the first embodiment. No explanation will be given here.

FIGS. 14A through 14D show the imaging field display states in a fourth embodiment of the present invention. In this embodiment, an imaging field is displayed by using dot patterns.

Figure 14A:
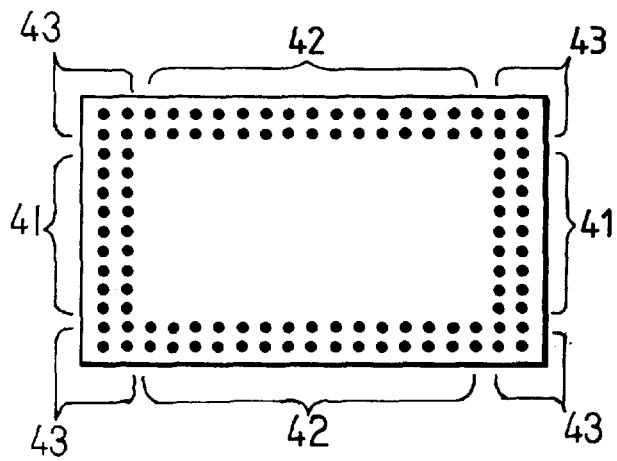
FIGS. 14A through 14D are diagrams showing the display states of imaging fields according to a fourth embodiment.
Figure 14B:
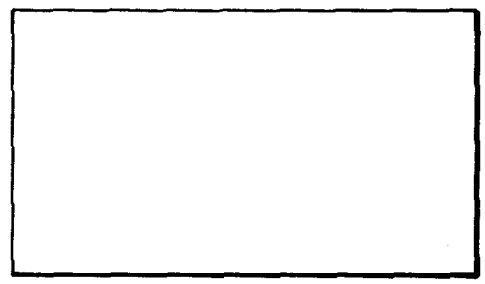
Figure 14C:
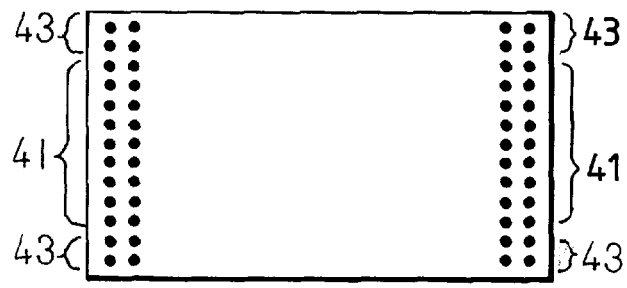
Figure 14D:
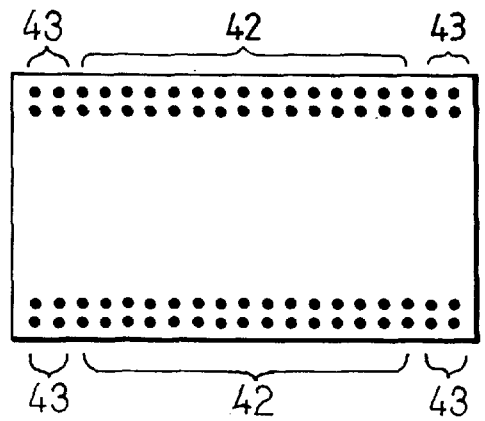

FIG. 14A shows all the liquid crystal patterns in the fourth embodiment. The imaging fields shown in FIGS. 14A through 14D are displayed by switching on or off a vertical liquid crystal mask pattern 41, a lateral liquid crystal mask pattern 42, and a common liquid crystal mask pattern 43. FIG. 14B shows the display state of the full size imaging field "H" when the liquid crystal patterns 41 through 43 are rendered inactive; FIG. 14C shows the display state of the vertical trimming imaging field "L" when the liquid crystal patterns 41 and 43 are rendered active; and FIG. 14D shows the display state of the lateral trimming imaging field "P" when the liquid crystal patterns 42 and 43 are rendered active. Since the components other than the liquid crystal patterns are referred by titles assigned them in the first embodiment, no explanation for them will be given.

The liquid crystal patterns are not limited to the linear patterns or the dot patterns described above; and other patterns may also be used.

As described above, according to the first through fourth embodiments of the present invention, when a vertically elongated imaging field or a laterally elongated imaging field is displayed in a viewfinder of a camera, light intercepted portions and light transmitted portions can be regularly arranged in the external area of the viewfinder region that corresponds to the size of a selected imaging field, a natural and smooth imaging field display can be provided, and a target image that corresponds to a full size imaging field can be also schematically distinguished.

FIGS. 15 through 24 show the display of an imaging field size according to a fifth embodiment of the present invention.

Figure 15:
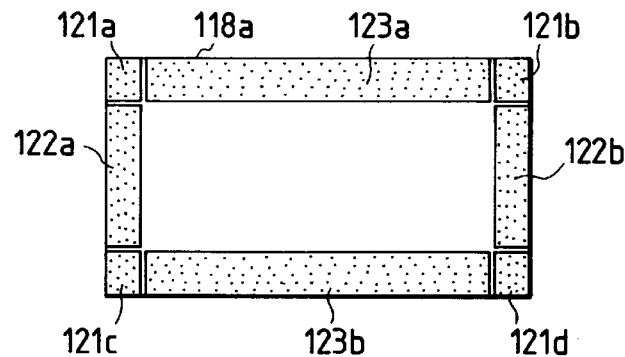
FIG. 15 is a diagram showing all the display patterns of imaging field regions in a liquid crystal display unit of a camera according to a fifth embodiment of the present invention.

FIG. 15 is a diagram showing all the liquid crystal patterns in an imaging field size liquid crystal display unit 117. A full size imaging field "H" is displayed using a face 118a inside along a field frame 118. Although the area outside the face 118a is blacked out when viewed through a viewfinder, the blacked out area is not shown in this diagram or in the other drawings. Reference numbers 121a, 121b, 121c, and 121d denote common liquid crystal mask patterns; 122a and 122b, vertical liquid crystal mask patterns; and 123a and 123b, lateral liquid crystal mask patterns.

Figure 16:
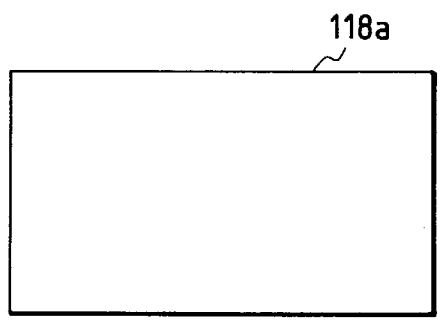
FIG. 16 is a diagram showing a full size imaging field displayed in the imaging field region liquid crystal display unit of the fifth embodiment.
Figure 17:
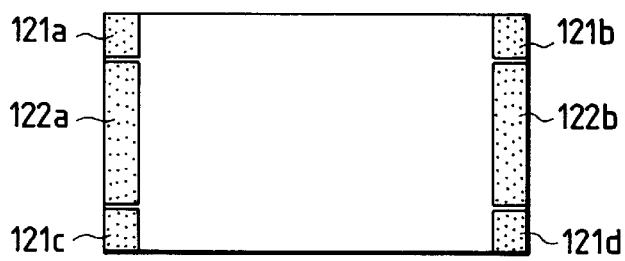
FIG. 17 is a diagram showing a vertically elongated imaging field displayed in a first display mode in the imaging field region liquid crystal display unit of the fifth embodiment.
Figure 18:
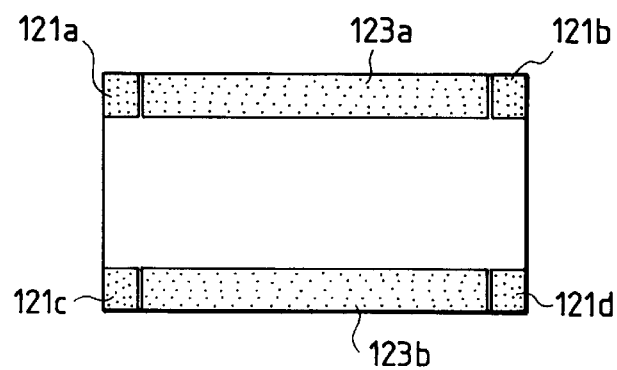
FIG. 18 is a diagram showing a laterally elongated imaging field displayed in the first display mode in the imaging field region liquid crystal display unit of the fifth embodiment.

FIG. 16 shows the display state for a full size imaging field "H"; FIG. 17 shows the display state for a vertical trimming imaging field "L" in a first display mode; and FIG. 18 shows the display state for a lateral trimming field "P" in the first display mode. The full size imaging field "H" in FIG. 16 is masked by the field frame 118 and is displayed on the face 118a. The imaging field "L" in FIG. 17 is masked by the common liquid crystal mask patterns 121a, 121b, 121c, and 121d and the vertical liquid crystal mask patterns 122a, 122b, 122c, and 122d. The imaging field "P" in FIG. 18 is masked by the common liquid crystal mask patterns 121a, 121b, 121c, and 121d and the lateral liquid crystal mask patterns 123a and 123b. When the common liquid crystal mask patterns 121a, 121b, 121c, and 121d, and the vertical and lateral liquid crystal mask patterns 122 and 123 are active in the first display mode in FIGS. 17 and 18, their regions are almost completely in the light intercepted state, so that the part of a target image that extends beyond the imaging field can hardly be distinguished visually.

Figure 19:
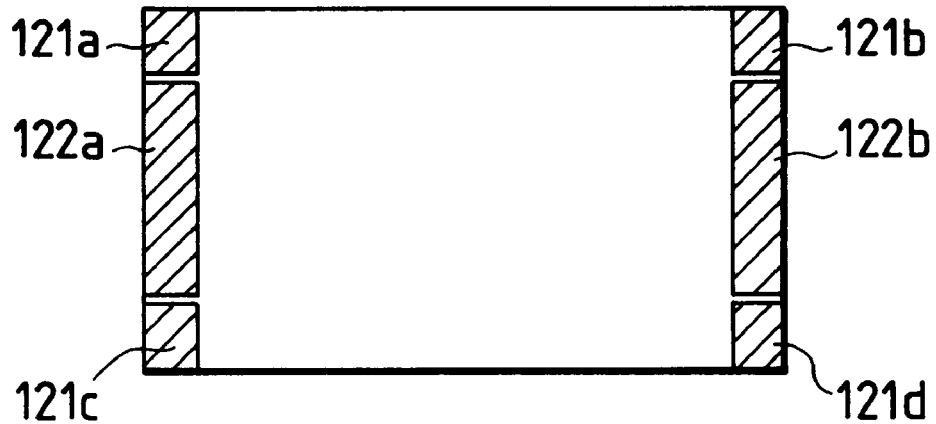
FIG. 19 is a diagram showing a vertically elongated imaging field displayed in a second display mode in the imaging field region liquid crystal display unit of the fifth embodiment.
Figure 20:
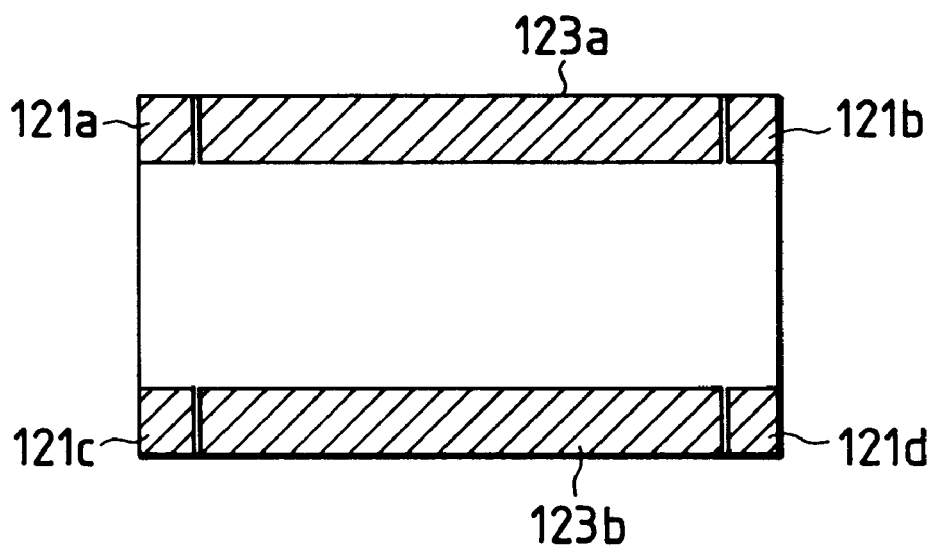
FIG. 20 is a diagram showing a laterally elongated imaging field displayed in the second display mode in the imaging field region liquid crystal display unit of the fifth embodiment.

FIG. 19 shows the display state of the vertical trimming imaging field "L" in a second display mode, and FIG. 20 shows the display state of the lateral trimming imaging field "P" in the second display mode. Since the mask liquid crystal patterns are the same as those in FIGS. 17 and 18, no explanation will be given for them. In the second display mode in FIGS. 19 and 20, the common liquid crystal mask patterns 121a, 121b, 121c, and 121d, and both the vertical and lateral liquid crystal patterns 122 and 123 are active, and the pattern regions are in the translucent state, so that a target image that extends beyond a given imaging field can be distinguished visually even though the amount of light is reduced. The shaded portions in the diagrams are in the translucent state. Since, by using this display system, an apparent shade can be recognized on a portion of a target image that extends beyond the exposed imaging field, an error, wherein a photographer erroneously sets a frame of a target image for the full size imaging field "H", can be avoided. The control methods for the first and second display modes will be described later.

FIG. 21 is a block diagram of a liquid crystal pattern driving circuit. A photographer employs an imaging field switching switch 124 to select the imaging field size, "H", "L", or "P", and uses a display mode switching switch 125 to select the first display mode shown in FIGS. 16 and 17 or the second display mode shown in FIGS. 19 and 20. Signals from the switches are sent to an MPU 126. A liquid crystal driver 127 includes a common liquid crystal mask driving means 128, a vertical liquid crystal mask driving means 129, and a lateral liquid crystal mask driving means 130. In response to a command from the MPU 126, the common liquid crystal mask pattern 121, the vertical liquid crystal mask pattern 122, or the lateral liquid crystal mask pattern 123 is driven by the liquid crystal driver. Since an imaging field size recording means 138 is identical to the imaging field size recording means 31 in FIG. 6 of the first embodiment, an explanation for it will not be given here.

Figure 24:
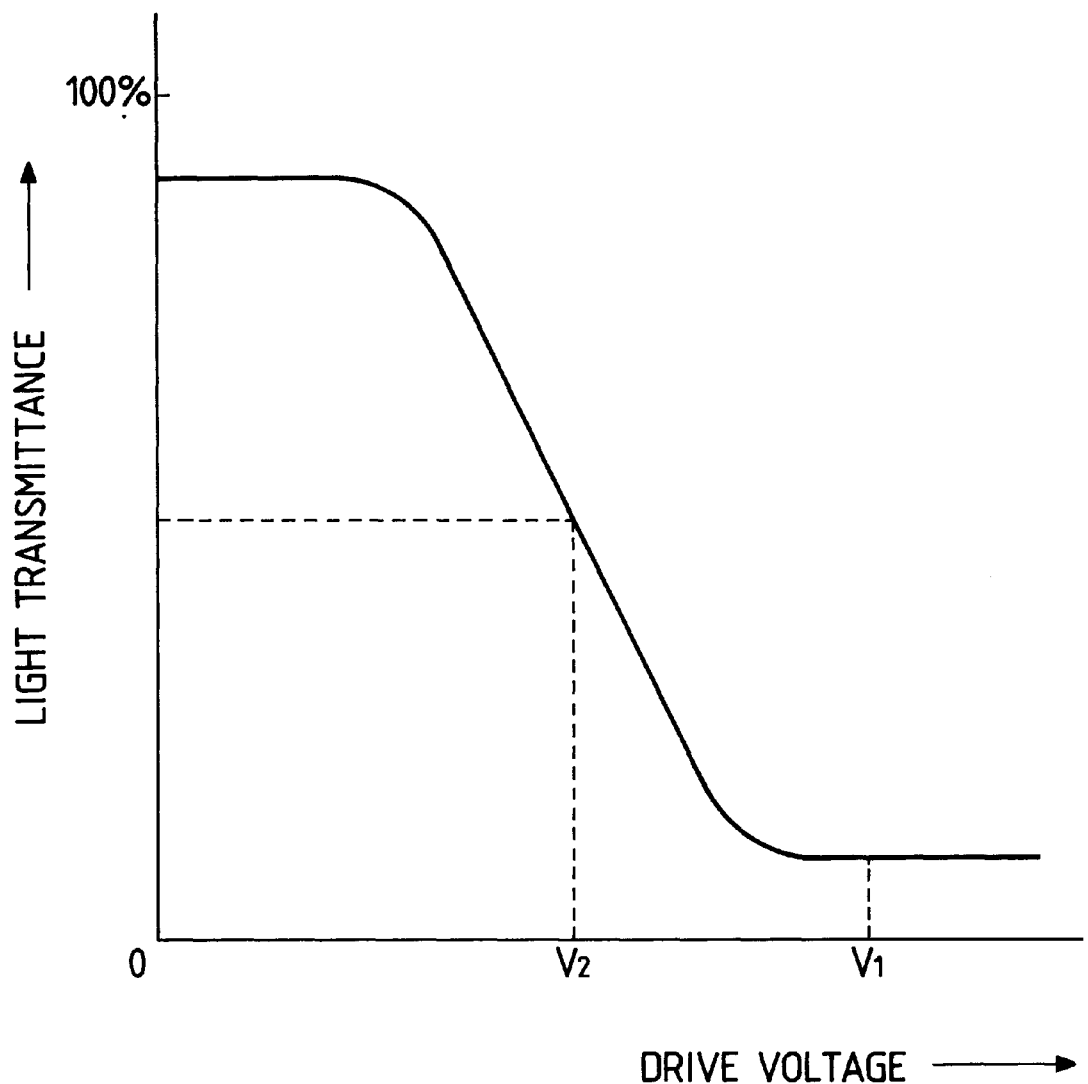
FIG. 24 is a graph showing a light transmittance characteristic of the imaging field region liquid crystal display unit of the fifth embodiment.

The method for controlling the first and second display modes will now be explained. FIGS. 22A and 22B show a liquid crystal driving method in the first display mode; FIGS. 23A and 23B shows a liquid crystal driving method in the second display mode; and FIG. 24 shows a light transmission characteristic of a liquid crystal. First, the transmission characteristic of a liquid crystal will be explained while referring to FIG. 24.

The liquid crystal device employed in this embodiment is a type that permits light to pass through when no voltage has been applied. When a voltage is applied, as the voltage level is gradually increased light transmittance is gradually decreased within a predetermined voltage region. When the voltage exceeds a predetermined level, the liquid crystal device enters an almost blacked out state. The liquid crystal device is in an almost blacked out state at the point that corresponds to drive voltage $V_1$ in the graph. This status corresponds to the first display mode. The liquid crystal device is in a semi-transparent state at the drive voltage point $V_2$. This status corresponds to the second display mode. It should be noted that the drive voltage described in the graph is the effective voltage.

Alternate current static driving is performed in the first display mode in FIGS. 22A and 22B. The voltages $V_1$ and $V_1$ are alternately applied to opposed electrodes 1 and 2 to maintain a constant potential difference, $V_1$, so that the first display mode in the almost blacked out state is provided.

In the second display mode in FIGS. 23A and 23B, alternate current static driving is performed as is described for FIGS. 22A and 22B, while drive duty is decreased. In other words, a period wherein a potential difference $V_1$ is being supplied and a period wherein it is not being supplied are alternately repeated to reduce the effective voltage. This driving method drops the effective voltage to $V_2$, and thus the second display mode in the semi-transparent state is provided.

Figure 25:
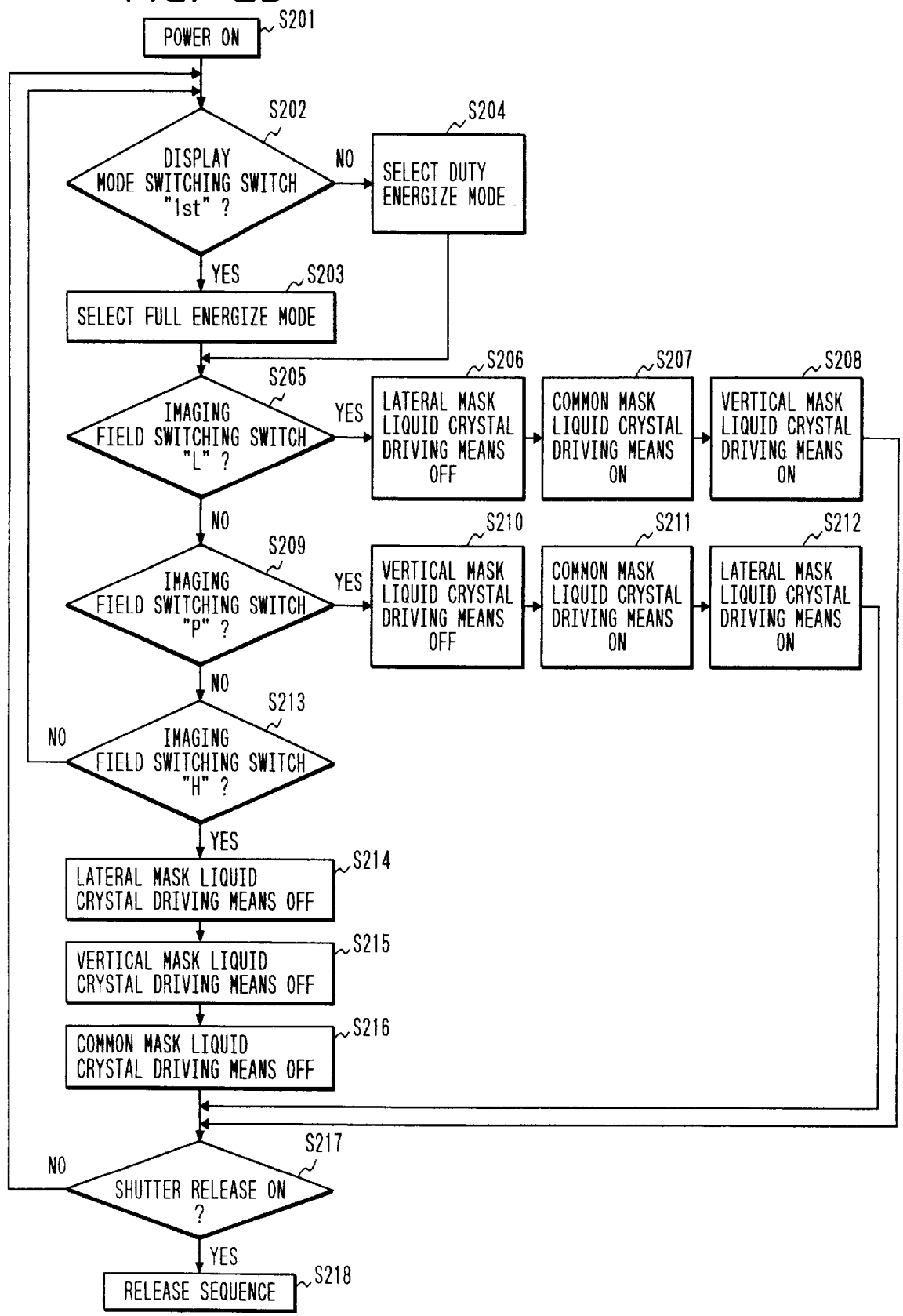
FIG. 25 is a flowchart of the processing for the fifth embodiment.

FIG. 25 is a flowchart of the switching process for imaging field sizes.

When power is turned on at S201, processing is performed in consonance with the state of the display mode switching switch 125. If, at S202, the first display mode has been selected, a full duty energize mode shown in FIGS. 22A and 22B is selected at S203. If, at S202, the first display mode is not selected, i.e., the second display mode has been selected, a duty energize mode shown in FIGS. 22A and 22B is selected at S204. The drive mode employed by the liquid crystal driver 127 is thus fixed to a mode that is determined through the above processing.

Then, processing is performed in consonance with the state of the imaging field size switching switch 124. When at S205 "L" has been selected, the lateral liquid crystal mask driving means 130 is turned off at S206, the common liquid crystal mask driving means 128 is turned on at S207, the vertical liquid crystal mask driving means 129 is turned on at S208, and the display state depicted in either FIG. 17 or in FIG. 19 is provided. If, at S205, "L" is not selected, program control advances to S209. If "P" has been selected at S205, the vertical liquid crystal mask driving means 129 is turned on at S210, the common liquid crystal mask driving means 128 and the lateral liquid crystal mask driving means 130 are turned on respectively at S211 and S212, and the display state depicted in FIG. 18 or in FIG. 20 is provided. If, at S209, "P" is not selected, program control moves to S213. When, at S213, "H" is not selected, program control returns to S202. When "H" has been selected, the lateral liquid crystal mask driving means 130, the vertical liquid crystal mask driving means 129, and the common liquid crystal mask driving means 128 are turned off respectively at S214, S215, and S216, and the state depicted in FIG. 16 is provided.

When a shutter release switch (not shown) is on at S217, program control moves to a release sequence at S218. According to a predetermined sequence, film exposure is performed, and at the same time the imaging field size recording means 138 is operated to record image data and imaging field size data on the film.

Figure 26:
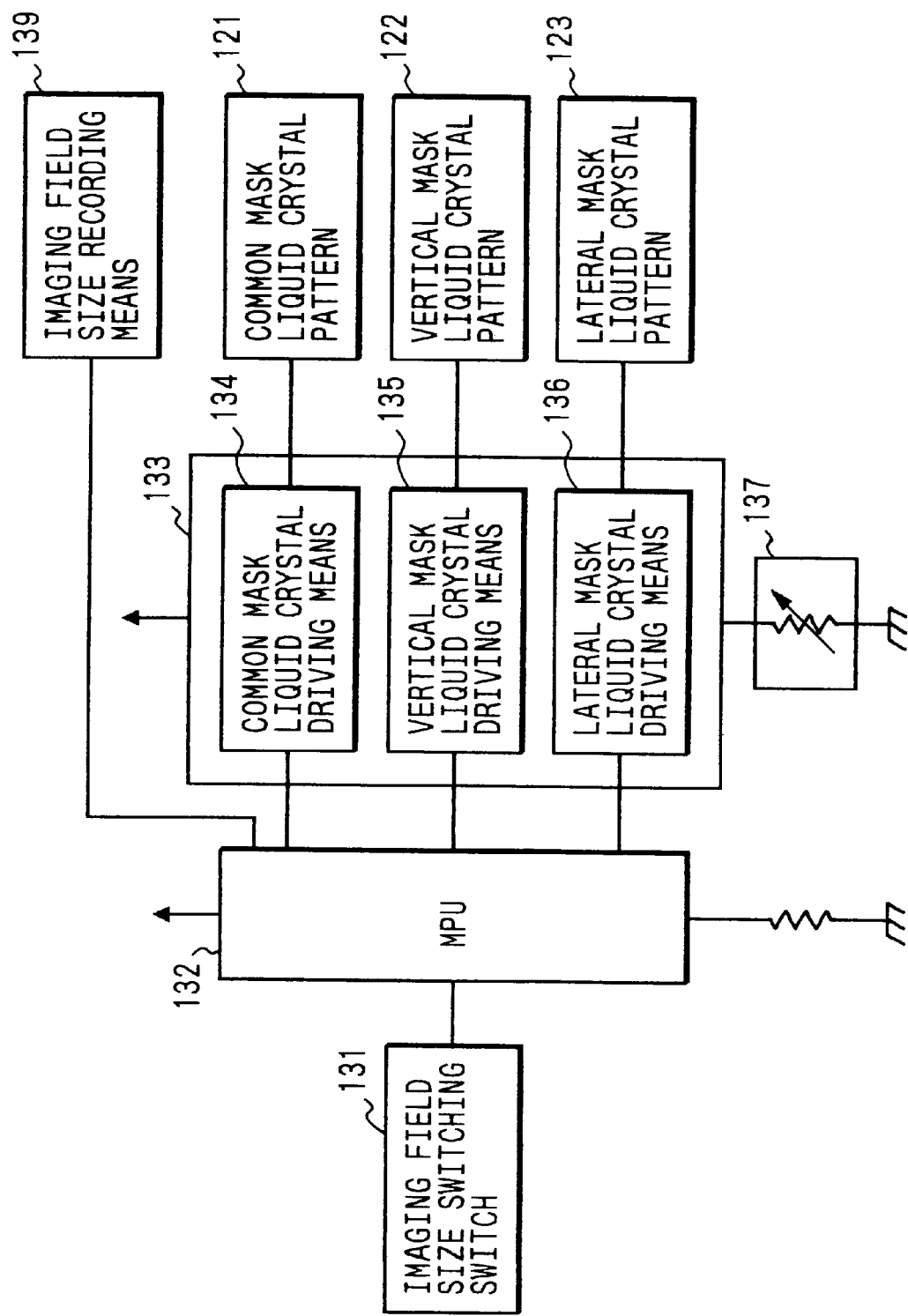
FIG. 26 is a block diagram illustrating a sixth embodiment.
Figure 27:
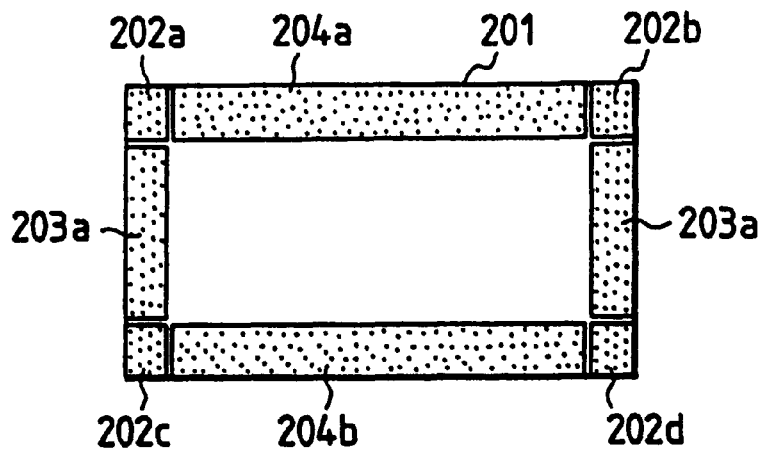
FIG. 27 is a diagram showing all the conventional display patterns of imaging field regions.
Figure 28:
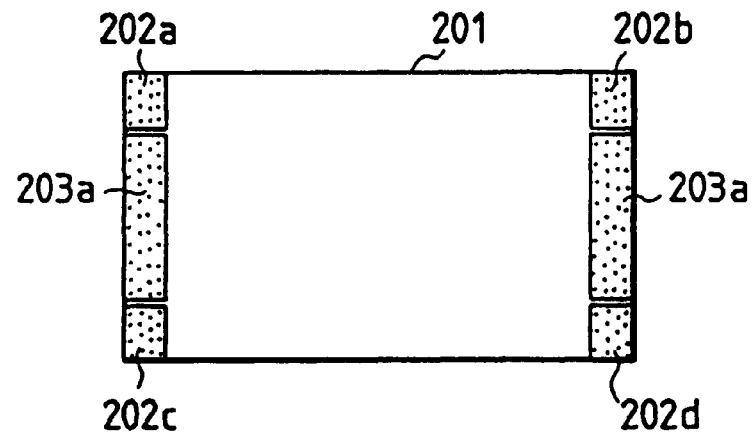
FIG. 28 is a diagram showing a vertically elongated imaging field in prior art.
Figure 29:
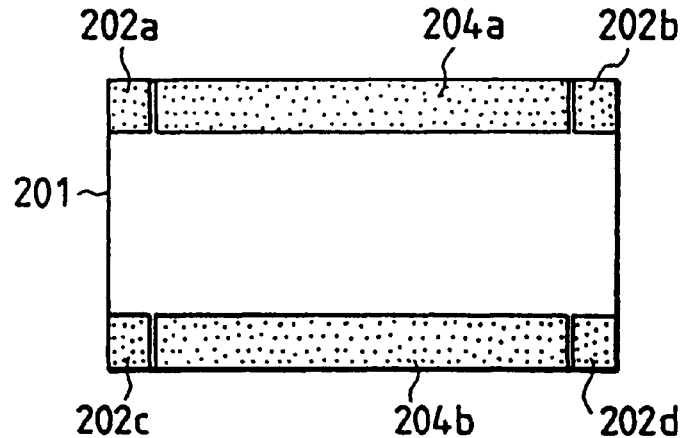
FIG. 29 is a diagram showing a laterally elongated imaging field in prior art.
Figure 30A:
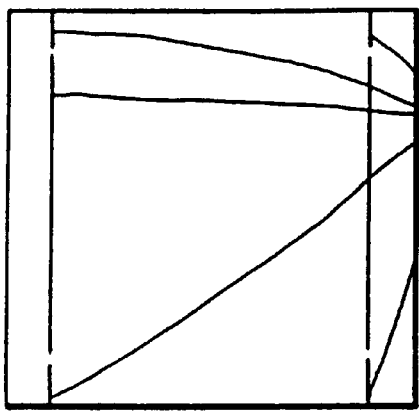
FIGS. 30A through 30D are diagrams showing imaging field switching states performed by a conventional mechanism that switches viewfinder imaging fields.
Figure 30B:
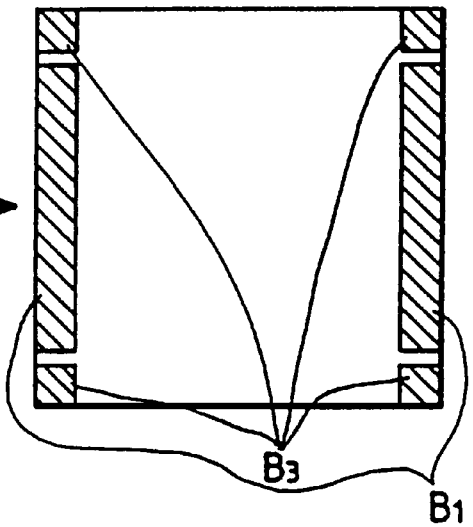
Figure 30C:
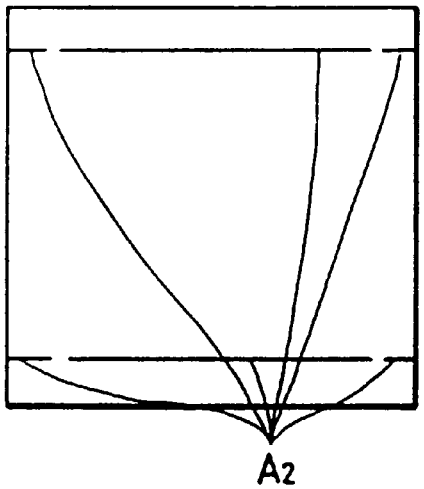
Figure 30D:
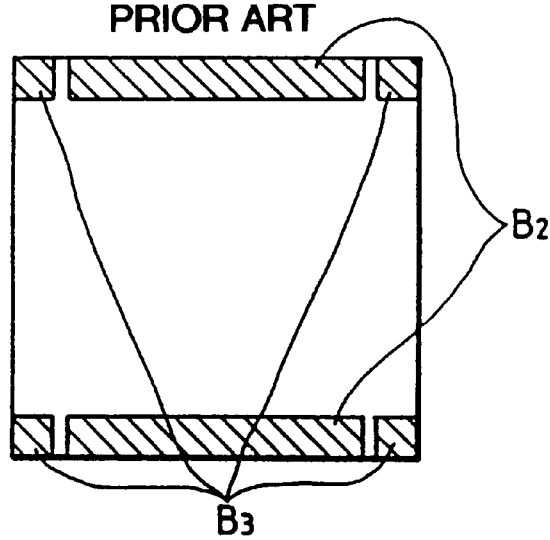

FIG. 26 is a diagram illustrating a sixth embodiment of the present invention. In this embodiment, the means employed in the fifth embodiment for controlling a liquid crystal drive voltage is changed.

A signal from an imaging field size switching switch 131 is transmitted to an MPU 132. Since the processing performed in response to this signal is the same as that in the fifth embodiment, an explanation of the processing will not be given. A liquid crystal driver includes a common liquid crystal mask driving means 134, a vertical liquid crystal mask driving means 135, and a lateral liquid crystal mask driving means 136. A photographer operates a display control member 137 to change the resistance of a variable resistor and thus varies a liquid crystal drive voltage that is to be sent to the liquid crystal driver 133. With this function, a photographer can arbitrarily control the drive voltage, such as $V_1$ or $V_2$ that is depicted in FIGS. 23A and 23B. By the above described method, the drive voltage is controlled, and according to the command from the MPU 132, the common liquid crystal mask pattern 121, the vertical liquid crystal mask pattern 122, and the lateral liquid crystal mask pattern 123 are driven via the liquid crystal driver 133 by the same drive method as that employed in FIGS. 22A and 22B. Since an imaging field size recording means 139 is identical to the imaging field size recording means 31 of the first embodiment, no explanation for it will be given here.

The devices that are employed for light interception are not limited to liquid crystals, other media that have an adequate light transmittance may be employed.

As described above, in the individual embodiments an imaging field is formed that has an external area that is in a semi-transparent state, so that an image in the external area is less visible because less light is supplied for it than is supplied for an image in a predetermined imaging field size. The possibility that a photographer may erroneously distinguish the size of an imaging field can thus be eliminated, and switching and display of the size of a simple imaging field that has fewer pattern division lines can be provided.

Although in the above embodiments the present invention has been employed for switching the imaging field sizes "H", "L", and "P", the present invention may also be applied for switching other imaging field sizes. Further, two or more of those embodiments, or their components, may be combined as needed for use. In addition, the use of the present invention is not limited to its use in a single-lens reflex camera, as shown in the embodiment, and may be applied for the switching of imaging field frames in shutter lens cameras, video cameras, and other optical apparatuses and devices.

Further, although in the above embodiments the imaging field size switching is performed by a liquid crystal device, other devices may be employed.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging field region display apparatus comprising:

a first display device which generates a display in a first region of an imaging field using a plurality of first display portions arranged at intervals to form a first display pattern; and a second display device which is controlled independently of said first display device and generates a display in a second region of the imaging field which differs from the first region of the imaging field and in a third region of the imaging field which is contiguous with the second region of the imaging field and overlays at least a portion of the first region of the imaging field, said second display device generating a display using a plurality of second display portions arranged at intervals to form a second display pattern, wherein the plurality of second display portions are interleaved between the plurality of first display portions in the third region of the imaging field.

2. An apparatus according to claim 1, wherein the plurality of first display portions are arranged at equal intervals in the first display pattern.

3. An apparatus according to claim 1, wherein the plurality of second display portions are arranged at equal intervals in the second display pattern.

4. An apparatus according to claim 2, wherein the plurality of second display portions are arranged at equal intervals in the second display pattern, wherein the interval between the plurality of first display portions in the first display pattern and the interval between the plurality of second display portions in the second display pattern are equal, and wherein in the third region of the imaging field the plurality of second display portions are arranged at equal intervals between the plurality of first display portions.

5. An apparatus according to any one of claims 1 to 4, wherein each of the plurality of first display portions and each of the plurality of second display portions has a like geometry.

6. An apparatus according to claim 5, wherein each of the plurality of first display portions and each of the plurality of second display portions is generally linear.

7. The apparatus according to claim 6, where each of the plurality of first display portions and each of the plurality of second display portions has a substantially horizontal orientation.

8. The apparatus according to claim 6, where each of the plurality of first display portions and each of the plurality of second display portions has an orientation forming an angle relative to a horizontal reference.

9. The apparatus according to claim 6, where each of the plurality of first display portions and each of the plurality of second display portions are substantially parallel.

10. An apparatus according to claim 1, wherein said first display device and said second display device include a photoelectric device the display state of which is changed by electric control.

11. An apparatus according to claim 10, wherein said first display device and said second display device include a liquid crystal device.

12. An apparatus according to claim 1, wherein said apparatus varies an imaging field frame display state of a viewfinder.

13. An apparatus according to claim 1, wherein said apparatus varies an imaging field frame display state of a viewfinder of a camera.

14. An apparatus according to claim 13, wherein said apparatus is provided in the camera.

15. An apparatus according to claim 13, wherein said first display device and said second display device generate an imaging field display for photographing.

16. An apparatus according to claim 15, wherein said first display device and said second display device include means for displaying a light exposed region.

17. An apparatus according to claim 13, wherein said first display device and said second display device generate an imaging field display frame for a printing operation.

18. An apparatus according to claim 13, wherein said first display device and said second display device include means for varying an imaging field display state in accordance with an imaging field for photographing.

19. An apparatus according to claim 13, wherein said first display device and said second display device include means for changing an imaging field display state in accordance with a light exposed region.

20. An apparatus according to claim 18, wherein said first display device and said second display device include means for changing an imaging field display state in accordance with an imaging field frame for a printing operation.

21. An apparatus according to claim 1, wherein the first display pattern is the same as the second display pattern, the second display pattern being offset from the first display pattern such that the plurality of second display portions are interleaved between the plurality of first display portions in the third region of the imaging field.

22. The apparatus according to claim 1, wherein the first display pattern is discontinuous.

23. The apparatus according to claim 1, wherein the second display pattern is discontinuous.

24. The apparatus according to claim 1, wherein each of the first display pattern and the second display pattern is discontinuous.

25. An optical apparatus comprising:

a first display device which generates a display in a first region of an imaging field using a plurality of first display portions arranged at intervals to form a first display pattern; and a second display device which is controlled independently of said first display device and generates a display in a second region of the imaging field which is different from the first region of the imaging field and in a third region of the imaging field which is contiguous with the second region of the imaging field and overlays at least a portion of the first region of the imaging field, said second display device generating a display using a plurality of second display portions arranged at intervals to form a second display pattern, wherein the plurality of second display portions are interleaved between the plurality of first display portions in the third region of the imaging field.

* * * * *

UNITED STATES PATENT AND TRADEMARK OFFICE
CERTIFICATE OF CORRECTION

PATENT NO. : 6,097,900

DATED : August 1, 2000

INVENTOR(S) : SHOSUKE HARAGUCHI

It is certified that error appears in the above-identified patent and that said Letters Patent is hereby corrected as shown below:

Column 1

Line 58, "has" should read --there has--.

Column 4

Line 44, "plain" should read --plane--.

Column 5

Line 3, "forms" should read --form--.
    Line 26, "not" should read --not be--.

Column 8

Line 8, "referred" should read --referred to--.

UNITED STATES PATENT AND TRADEMARK OFFICE
CERTIFICATE OF CORRECTION

PATENT NO. : 6,097,900

DATED : August 1, 2000

INVENTOR(S) : SHOSUKE HARAGUCHI

It is certified that error appears in the above-identified patent and that said Letters Patent is hereby corrected as shown below:

Column 9

Line 29, "shows" should read --show--.
   Line 50, "$V_1$" should read -- $-V_1$ --.

Signed and Sealed this

Twenty-fourth Day of April, 2001

Attest:

NICHOLAS P. GODICI

Attesting Officer     Acting Director of the United States Patent and Trademark Office